(12) United States Patent
Kwon et al.

(10) Patent No.: US 10,393,234 B2
(45) Date of Patent: Aug. 27, 2019

(54) PLANETARY GEAR TRAIN OF TRANSMISSION FOR VEHICLE

(71) Applicants: Hyundai Motor Company, Seoul (KR); Kia Motors Corporation, Seoul (KR)

(72) Inventors: Hyun Sik Kwon, Seoul (KR); Seongwook Ji, Gunpo-si (KR); Juhyeon Park, Suwon-si (KR); Ilhan Yoo, Seongnam-si (KR); Seong Wook Hwang, Gunpo-si (KR); Ki Tae Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 109 days.

(21) Appl. No.: 15/817,570

(22) Filed: Nov. 20, 2017

(65) Prior Publication Data

US 2019/0078649 A1 Mar. 14, 2019

(30) Foreign Application Priority Data

Sep. 12, 2017 (KR) ........................ 10-2017-0116709

(51) Int. Cl.
*F16H 3/66* (2006.01)
*F16H 3/44* (2006.01)

(52) U.S. Cl.
CPC ......... *F16H 3/66* (2013.01); *F16H 2003/445* (2013.01); *F16H 2200/0069* (2013.01); *F16H 2200/2012* (2013.01); *F16H 2200/2046* (2013.01)

(58) Field of Classification Search
CPC ................. F16H 3/66; F16H 2003/445; F16H 2200/2012; F16H 2200/0069; F16H 2200/2046
See application file for complete search history.

(56) References Cited

U.S. PATENT DOCUMENTS

| 3,971,267 | A | * | 7/1976 | Murakami | ............... F16H 3/666 475/276 |
| 4,046,031 | A | * | 9/1977 | Ott | ............................ F16H 3/66 475/280 |
| 4,683,776 | A | * | 8/1987 | Klemen | .................... F16H 3/66 475/286 |
| 6,176,803 | B1 | * | 1/2001 | Meyer | ..................... F16H 3/666 475/276 |

(Continued)

*Primary Examiner* — David R Morris
(74) *Attorney, Agent, or Firm* — Slater Matsil, LLP

(57) ABSTRACT

A planetary gear train includes input and output shafts, and first to fourth planetary gear sets respectively having first to third, fourth to sixth, seventh to ninth, and tenth to twelfth elements. A first shaft is connected to the third element and selectively connected to the input shaft, a second shaft is connected to the ninth element and selectively connected to the input shaft, a third shaft is connected to the eleventh element and the output shaft, a fourth shaft is connected to the first, fourth, and seventh elements, and a fifth shaft is connected to the second and tenth elements. A plurality of shafts each selectively connect a corresponding element to a transmission housing, the corresponding element being an element of the second, third, and fourth planetary gear sets that is not interconnected.

15 Claims, 2 Drawing Sheets

(56) References Cited

U.S. PATENT DOCUMENTS

| | | | | |
|---|---|---|---|---|
| 8,343,005 B2* | 1/2013 | Hart | F16H 3/66 | 475/276 |
| 8,343,007 B2* | 1/2013 | Hart | F16H 3/66 | 475/288 |
| 8,398,522 B2* | 3/2013 | Bauknecht | F16H 3/66 | 475/275 |
| 9,068,630 B2* | 6/2015 | Thomas | F16H 3/66 | |
| 9,194,464 B2* | 11/2015 | Beck | F16H 3/66 | |
| 9,222,553 B2* | 12/2015 | Beck | F16H 3/666 | |
| 9,234,569 B2* | 1/2016 | Beck | F16H 3/66 | |
| 9,267,576 B2* | 2/2016 | Beck | F16H 3/66 | |
| 9,377,086 B2* | 6/2016 | Beck | F16H 3/66 | |
| 9,568,069 B2* | 2/2017 | Beck | F16H 3/66 | |
| 9,599,195 B2* | 3/2017 | Beck | F16H 3/66 | |
| 9,777,804 B2* | 10/2017 | Lee | F16H 3/66 | |
| 9,897,172 B2* | 2/2018 | Kook | F16H 3/66 | |
| 10,260,601 B1* | 4/2019 | Kwon | F16H 3/66 | |
| 2011/0009229 A1* | 1/2011 | Bauknecht | F16H 3/66 | 475/275 |
| 2011/0256977 A1* | 10/2011 | Hart | F16H 3/66 | 475/275 |
| 2012/0196718 A1* | 8/2012 | Hart | F16H 3/66 | 475/271 |
| 2014/0187378 A1* | 7/2014 | Thomas | F16H 3/66 | 475/288 |
| 2015/0094185 A1* | 4/2015 | Beck | F16H 3/66 | 475/275 |
| 2015/0119187 A1* | 4/2015 | Beck | F16H 3/66 | 475/276 |
| 2015/0141195 A1* | 5/2015 | Beck | F16H 3/66 | 475/278 |
| 2015/0184724 A1* | 7/2015 | Beck | F16H 3/666 | 475/275 |
| 2015/0267782 A1* | 9/2015 | Beck | F16H 3/66 | 475/278 |
| 2016/0040755 A1* | 2/2016 | Wehlen | F16H 3/66 | 475/277 |
| 2016/0053867 A1* | 2/2016 | Beck | F16H 3/66 | 475/275 |
| 2016/0053869 A1* | 2/2016 | Beck | F16H 3/66 | 475/275 |
| 2016/0084353 A1* | 3/2016 | Beck | F16H 3/66 | 475/278 |
| 2017/0219057 A1* | 8/2017 | Lee | F16H 3/66 | |
| 2017/0268617 A1* | 9/2017 | Kook | F16H 3/66 | |
| 2019/0078651 A1* | 3/2019 | Kwon | F16H 3/66 | |
| 2019/0078653 A1* | 3/2019 | Kwon | F16H 3/66 | |
| 2019/0078655 A1* | 3/2019 | Yoo | F16H 3/66 | |
| 2019/0078657 A1* | 3/2019 | Kwon | F16H 3/66 | |
| 2019/0085944 A1* | 3/2019 | Yoo | F16H 3/66 | |
| 2019/0085948 A1* | 3/2019 | Yoo | F16H 3/66 | |
| 2019/0085951 A1* | 3/2019 | Kwon | F16H 3/66 | |
| 2019/0093741 A1* | 3/2019 | Kwon | F16H 3/66 | |

* cited by examiner

FIG. 2

| Shift-stage | Engagement element | | | | | | Gear ratio |
|---|---|---|---|---|---|---|---|
| | C1 | C2 | C3 | C4 | B1 | B2 | |
| D1 | ● | | | | | ● | 6.338 |
| D2 | ● | | ● | | | ● | 3.900 |
| D3 | ● | | | ● | | ● | 2.668 |
| D4 | ● | ● | | | | ● | 1.861 |
| D5 | | ● | ● | | | ● | 1.525 |
| D6 | | ● | ● | ● | | ● | 1.013 |
| D7 | ● | ● | ● | | | | 1.000 |
| D8 | | ● | | ● | ● | | 0.983 |
| D9 | | ● | | | ● | | 0.685 |
| D10 | ● | | ● | | ● | | 0.619 |
| REV | ● | | | | ● | | -2.753 |

PLANETARY GEAR TRAIN OF TRANSMISSION FOR VEHICLE

CROSS-REFERENCE TO RELATED APPLICATIONS

This application claims priority to Korean Patent Application No. 10-2017-0116709, filed in the Korean Intellectual Property Office on Sep. 12, 2017, which application is hereby incorporated herein by reference.

TECHNICAL FIELD

The present invention relates to an automatic transmission for a vehicle.

BACKGROUND

Research on realizing more shift-stages of an automatic transmission is undertaken to achieve enhancement of fuel consumption and better drivability, and recently, the increase in oil prices has triggered a hard competition in enhancing fuel consumption of a vehicle.

In this sense, research on an engine to achieve weight reduction and to enhance fuel consumption by so-called downsizing research for use with an automatic transmission has been performed to simultaneously provide better drivability and fuel consumption by achieving more shift stages for the automatic transmission.

In order to achieve more shift stages for an automatic transmission, the number of parts is typically increased, which may adversely affect installability, production cost, weight and/or power flow efficiency.

Therefore, in order to maximally enhance fuel consumption of an automatic transmission having more shift stages, it is important for better efficiency to be derived with a smaller number of parts.

In this respect, an eight-speed automatic transmission has been recently introduced, and a planetary gear train for an automatic transmission enabling more shift stages is under investigation.

An automatic transmission of eight or more shift-stages typically includes three to four planetary gear sets and five to seven engagement elements (which may be frictional elements), and may easily become lengthy, thereby deteriorating installability.

In this regard, disposing planetary gear sets in parallel, or employing dog clutches instead of wet-type control elements, is sometimes attempted. However, such an arrangement may not be widely applicable, and using dog clutches may easily deteriorate shift-feel.

The above information disclosed in this Background section is only for enhancement of understanding of the background of the invention and therefore it may contain information that does not form the prior art that is already known in this country to a person of ordinary skill in the art.

SUMMARY

Embodiments in the present disclosure relate to a planetary gear train of an automatic transmission for a vehicle enabling at least ten forward speeds, thereby providing better performance and fuel efficiency of a vehicle.

A planetary gear train according to an exemplary embodiment includes an input shaft for receiving an engine torque, an output shaft for outputting a shifted torque, a first planetary gear set having first, second, and third rotational elements, a second planetary gear set having fourth, fifth, and sixth rotational elements, a third planetary gear set having seventh, eighth, and ninth rotational elements, and a fourth planetary gear set having tenth, eleventh, and twelfth rotational elements. An embodiment planetary gear train may further include a first shaft fixedly connected with the third rotational element and selectively connected with the input shaft, a second shaft fixedly connected with the ninth rotational element and selectively connected with the input shaft, a third shaft fixedly connected with the eleventh rotational element and fixedly connected with the output shaft, a fourth shaft fixedly connected with the first rotational element, the fourth rotational element, and the seventh rotational element, a fifth shaft fixedly connected with the second rotational element and the tenth rotational element, and a plurality of shafts each selectively connecting a corresponding element to the transmission housing, with the corresponding element being a rotational element of the second, third, and fourth planetary gear sets that is not fixedly interconnected.

The plurality of shafts may include a sixth shaft fixedly connected with the fifth rotational element and the eighth rotational element and selectively connected with the transmission housing, and a seventh shaft fixedly connected with the sixth rotational element and the twelfth rotational element and selectively connected with the transmission housing. The input shaft and the first shaft, the input shaft and the second shaft, the first shaft and the fifth shaft, and the first shaft and the sixth shaft may be selectively interconnected with each other respectively.

Embodiments of the planetary gear train may further include four clutches each selectively connecting a corresponding pair among the input shaft, the output shaft, and the first to seventh shafts, and two brakes selectively connecting the sixth shaft and the seventh shaft to the transmission housing respectively.

The four clutches may include a first clutch arranged between the input shaft and the first shaft, a second clutch arranged between the input shaft and the second shaft, a third clutch arranged between the first shaft and the fifth shaft, and a fourth clutch arranged between the first shaft and the sixth shaft. The two brakes may include a first brake arranged between the sixth shaft and the transmission housing, and a second brake arranged between the seventh shaft and the transmission housing.

The first planetary gear set may be a single pinion planetary gear set having a first sun gear, a first planet carrier, and a first ring gear as the first, second, and third rotational elements. The second planetary gear set may be a single pinion planetary gear set having a second sun gear, a second planet carrier, and a second ring gear as the fourth, fifth, and sixth rotational elements. The third planetary gear set may be a single pinion planetary gear set having a third sun gear, a third planet carrier, and a third ring gear as the seventh, eighth, and ninth rotational elements. The fourth planetary gear set may be a single pinion planetary gear set having a fourth sun gear, a fourth planet carrier, and a fourth ring gear as the tenth, eleventh, and twelfth rotational elements.

The first, second, third, and fourth planetary gear sets may be arranged in the order of the third, second, fourth, and first planetary gear sets from an engine side.

A planetary gear train according to an exemplary embodiment of the present invention may realize at least ten forward speeds and one reverse speed by combination of four planetary gear sets using simple planetary gear sets together with six engagement elements.

In addition, a planetary gear train according to an exemplary embodiment of the present invention may substantially improve driving stability by realizing shift-stages appropriate for rotation speed of an engine using multi-stages of an automatic transmission.

In addition, a planetary gear train according to an exemplary embodiment of the present invention may maximize engine driving efficiency using multi-stages of an automatic transmission, and may improve power delivery performance and fuel consumption.

Further, effects that can be obtained or expected from exemplary embodiments of the present invention are directly or suggestively described in the following detailed description. That is, various effects expected from exemplary embodiments of the present invention will be described in the following detailed description.

BRIEF DESCRIPTION OF THE DRAWINGS

FIG. 2 is an operational chart for respective control elements at respective shift-stages applicable to a planetary gear train according to an exemplary embodiment of the present invention.

DETAILED DESCRIPTION OF ILLUSTRATIVE EMBODIMENTS

Figure 1:
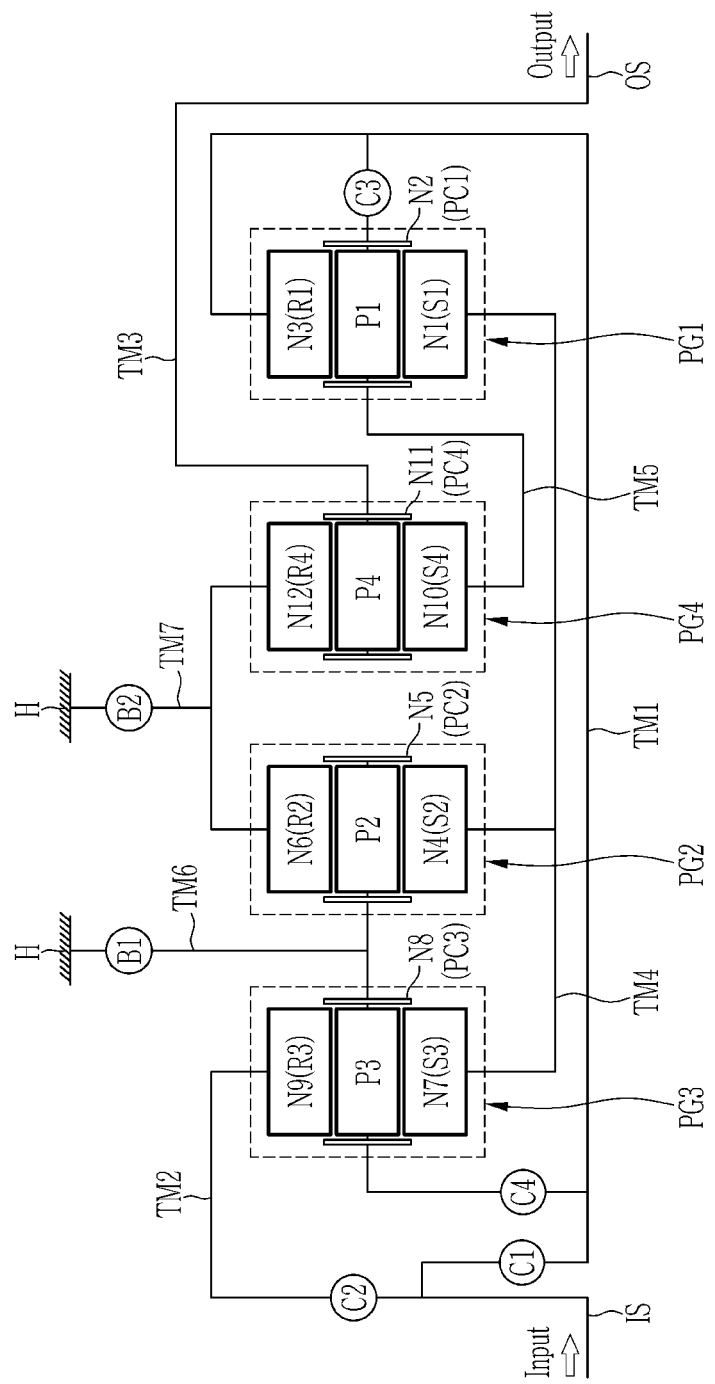
FIG. 1 is a schematic diagram of a planetary gear train according to an exemplary embodiment of the present invention.

Hereinafter, an exemplary embodiment of the present invention will be described in detail with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG. 1, a planetary gear train according to an exemplary embodiment of the present invention includes first, second, third, and fourth planetary gear sets PG1, PG2, PG3, and PG4 arranged on a same axis, an input shaft IS, an output shaft OS, seven shafts TM1 to TM7 interconnecting rotational elements of the first, second, third, and fourth planetary gear sets PG1, PG2, PG3, and PG4, engagement elements of four clutches C1 to C4 and two brakes B1 and B2, and a transmission housing H.

Torque input from the input shaft IS is shifted by cooperative operation of the first, second, third, and fourth planetary gear sets PG1, PG2, PG3, and PG4, and then output through the output shaft OS.

The planetary gear sets are arranged in the order of the third, the second, and the fourth, first planetary gear set (PG3, PG2, PG4, PG1), from an engine side.

The input shaft IS is an input member and may receive a torque from a crankshaft of an engine through a torque converter.

The output shaft OS is an output member arranged on a same axis with the input shaft IS, and outputs a shifted driving torque to a driveshaft through a differential apparatus.

The first planetary gear set PG1 is a single pinion planetary gear set, and includes a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1 engaged with the first sun gear S1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2 engaged with the second sun gear S2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 rotatably supporting a plurality of third pinion gears P3 externally gear-meshed with the third sun gear S3, and a third ring gear R3 internally gear-meshed with the plurality of third pinion gears P3 engaged with the third sun gear S3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set, and includes a fourth sun gear S4, a fourth planet carrier PC4 rotatably supporting a plurality of fourth pinion gears P4 externally gear-meshed with the fourth sun gear S4, and a fourth ring gear R4 internally gear-meshed with the plurality of fourth pinion gears P4 engaged with the fourth sun gear S4. The fourth sun gear S4 acts as a tenth rotational element N10, the fourth planet carrier PC4 acts as an eleventh rotational element N11, and the fourth ring gear R4 acts as a twelfth rotational element N12.

In the first, second, third, and fourth planetary gear sets PG1, PG2, PG3, and PG4, the first rotational element N1 is fixedly connected with the fourth rotational element N4 and the seventh rotational element N7, the second rotational element N2 is fixedly connected with the tenth rotational element N10, the fifth rotational element N5 is fixedly connected with the eighth rotational element N8, the sixth rotational element N6 is fixedly connected with twelfth rotational element N12, and seven shafts TM1 to TM7 are formed.

The seven shafts TM1 to TM7 are hereinafter described in detail.

The first shaft TM1 is fixedly connected with the third rotational element N3 (first ring gear R1), and selectively connected with the input shaft IS, thereby selectively acting as an input element.

The second shaft TM2 is fixedly connected with the ninth rotational element N9 (third ring gear R3), and selectively connected with the input shaft IS, thereby selectively acting as an input element.

The third shaft TM3 is fixedly connected with the eleventh rotational element N11 (fourth planet carrier PC4), and fixedly connected with the output shaft OS thereby always acting as an output element.

The fourth shaft TM4 is fixedly connected with the first rotational element N1 (first sun gear S1), the fourth rotational element N4 (second sun gear S2), and the seventh rotational element N7 (third sun gear S3).

The fifth shaft TM5 is fixedly connected with second rotational element N2 (first planet carrier PC1) and tenth rotational element N10 (fourth sun gear S4).

The sixth shaft TM6 is fixedly connected with fifth rotational element N5 (second planet carrier PC2) and eighth rotational element N8 (third planet carrier PC3).

The seventh shaft TM7 is fixedly connected with sixth rotational element N6 (second ring gear R2) and twelfth rotational element N12 (fourth ring gear R4).

Each of the seven shafts TM1 to TM7 may be a rotational member that fixedly interconnects the input and output shafts and rotational elements of the planetary gear sets PG1, PG2, PG3, and PG4, or may be a rotational member that selectively interconnects a rotational element to the transmission housing H, or may be a fixed member fixed to the transmission housing H.

In the disclosure, when two or more members are described to be "fixedly connected", where the member may be any one or more of a shaft, an input shaft, an output shaft, a rotational member, and a transmission housing, it means that the fixedly connected members always rotate at a same speed.

When two or more members are described to be "selectively connected" by an engagement element, it means that the selectively connected members rotates separately when the engagement element is not engaged, and rotates at a same speed when the engagement element is engaged. It may be understood that in the case that a member is "selectively connected" with a transmission housing by an engagement element, the member may be stationary when the engagement element is engaged.

The first shaft TM1 is selectively connected with the input shaft IS, the second shaft TM2 is selectively connected with the input shaft IS, and the first shaft TM1 is selectively connected with the fifth shaft TM5 and the sixth shaft TM6 respectively.

The sixth shaft TM6 and the seventh shaft TM7 are selectively connected with the transmission housing H, thereby selectively acting as fixed elements respectively.

The engagement elements of four clutches C1, C2, C3, and C4 are arranged between the seven shafts TM1 to TM7, the input shaft IS, and the output shaft OS, so as to form selective connections.

The seven shafts TM1 to TM7 may be selectively connected with the transmission housing H, by control elements of two brakes B1 and B2.

The six engagement elements of the four clutches C1 to C4 and the two brakes B1 and B2 are arranged as follows.

The first clutch C1 is arranged between the input shaft IS and the first shaft TM1, and selectively connects the input shaft IS and the first shaft TM1, thereby controlling power delivery therebetween.

The second clutch C2 is arranged between the input shaft IS and the second shaft TM2, and selectively connects the input shaft IS and the second shaft TM2, thereby controlling power delivery therebetween.

The third clutch C3 is arranged between the first shaft TM1 and the fifth shaft TM5, and selectively connects the first shaft TM1 and the fifth shaft TM5, thereby controlling power delivery therebetween.

The fourth clutch C4 is arranged between the first shaft TM1 and the sixth shaft TM6, and selectively connects the first shaft TM1 and the sixth shaft TM6, thereby controlling power delivery therebetween.

The first brake B1 is arranged between the sixth shaft TM6 and the transmission housing H, and selectively connects the sixth shaft TM6 to the transmission housing H.

The second brake B2 is arranged between the seventh shaft TM7 and the transmission housing H, and selectively connects the seventh shaft TM7 to the transmission housing H.

The engagement elements of the first, second, third, and fourth clutches C1, C2, C3, and C4 and the first and second brakes B1 and B2 may be realized as multi-plate hydraulic pressure friction devices that are frictionally engaged by hydraulic pressure, however, it should not be understood to be limited thereto, since various other configuration that are electrically controllable may be available.

FIG. 2 is an operational chart for respective control elements at respective shift-stages applicable to a planetary gear train according to an exemplary embodiment of the present invention.

Referring to FIG. 2, a planetary gear train according to an exemplary embodiment of the present invention realizes shifting between ten forward speeds and one reverse speed by operating three elements among the engagement elements of the first, second, third, and fourth clutches C1, C2, C3, and C4 and the first and second brakes B1 and B2.

In the forward first speed D1, the first clutch C1 and the first and second brakes B1 and B2 are simultaneously operated.

As a result, the first shaft TM1 is connected with the input shaft IS by the operation of the first clutch C1. In this state, the input torque is input to the first shaft TM1.

In the above state, the sixth and seventh shafts TM6 and TM7 act as fixed elements respectively by the operation of the first and second brakes B1 and B2, thereby realizing the forward first speed and outputting a shifted torque to the output shaft OS connected with the third shaft TM3.

In the forward second speed D2, the first and third clutches C1 and C3 and the second brake B2 are simultaneously operated.

As a result, the first shaft TM1 is connected with the input shaft IS by the operation of the first clutch C1, and the first shaft TM1 is connected with the fifth shaft TM5 by the operation of the third clutch C3. In this state, the input torque is input to the first shaft TM1.

In addition, the seventh shaft TM7 acts as a fixed element by the operation of the second brake B2, thereby realizing the forward second speed and outputting a shifted torque to the output shaft OS connected with the third shaft TM3.

In the forward third speed D3, the first and fourth clutches C1 and C4 and the second brake B2 are simultaneously operated.

As a result, the first shaft TM1 is connected with the input shaft IS by the operation of the first clutch C1, and the first shaft TM1 is connected with the sixth shaft TM6 by the operation of the fourth clutch C4. In this state, the input torque is input to the first shaft TM1.

In addition, the seventh shaft TM7 acts as a fixed element by the operation of the second brake B2, thereby realizing the forward third speed and outputting a shifted torque to the output shaft OS connected with the third shaft TM3.

In the forward fourth speed D4, the first and second clutch C1 and C2 and the second brake B2 are simultaneously operated.

As a result, the first shaft TM1 is connected with the input shaft IS by the operation of the first clutch C1, and the second shaft TM2 is connected with the input shaft IS by the operation of the second clutch C2. In this state, an input torque is input to the first shaft TM1 and the second shaft TM2.

In addition, the seventh shaft TM7 acts as a fixed element by the operation of the second brake B2, thereby realizing the forward fourth speed and outputting a shifted torque to the output shaft OS connected with the third shaft TM3.

In the forward fifth speed D5, the second and fourth clutches C2 and C4 and the second brake B2 are simultaneously operated.

As a result, the second shaft TM2 is connected with the input shaft IS by the operation of the second clutch C2, and the first shaft TM1 is connected with the sixth shaft TM6 by the operation of the fourth clutch C4. In this state, the input torque is input to the second shaft TM2.

In addition, the seventh shaft TM7 acts as a fixed element by the operation of the second brake B2, thereby realizing the forward fifth speed and outputting a shifted torque to the output shaft OS connected with the third shaft TM3.

In the forward sixth speed D6, the second and third clutches C2 and C3 and the second brake B2 are simultaneously operated.

As a result, the second shaft TM2 is connected with the input shaft IS by the operation of the second clutch C2, and the first shaft TM1 is connected with the fifth shaft TM5 by the operation of the third clutch C3. In this state, the input torque is input to the second shaft TM2.

In addition, the seventh shaft TM7 acts as a fixed element by the operation of the second brake B2, thereby realizing the forward sixth speed and outputting a shifted torque to the output shaft OS connected with the third shaft TM3.

In the forward seventh speed D7, the first, second, and third clutches C1, C2, and C3 are simultaneously operated.

As a result, the first shaft TM1 is connected with the input shaft IS by the operation of the first clutch C1, the second shaft TM2 is connected with the input shaft IS by the operation of the second clutch C2, and the first shaft TM1 is fixedly connected with the fifth shaft TM5 by the operation of the third clutch C3.

Then, the first, second, third, and fourth planetary gear sets PG1, PG2, PG3, and PG4 integrally rotate, and a torque is input to the first shaft TM1 and the second shaft TM2, thereby realizing the forward seventh speed where a torque is output as inputted, and outputting a shifted torque to the output shaft OS connected with the third shaft TM3.

In the forward eighth speed D8, the first and third clutches C1 and C3 and the first brake B1 are simultaneously operated.

As a result, the first shaft TM1 is connected with the input shaft IS by the operation of the first clutch C1, and the first shaft TM1 is connected with the fifth shaft TM5 by the operation of the third clutch C3. In this state, the input torque is input to the first shaft TM1.

In addition, the sixth shaft TM6 acts as a fixed element by the operation of the first brake B1, thereby realizing the forward eighth speed and outputting a shifted torque to the output shaft OS connected with the third shaft TM2.

In the forward ninth speed D9, the first and fourth clutches C1 and C4 and the first brake B1 are simultaneously operated.

As a result, the first shaft TM1 is connected with the input shaft IS by the operation of the first clutch C1, and the first shaft TM1 is connected with the sixth shaft TM6 by the operation of the fourth clutch C4. In this state, the input torque is input to the first shaft TM1.

In addition, the sixth shaft TM6 acts as a fixed element by the operation of the first brake B1, thereby realizing the forward ninth speed and outputting a shifted torque to the output shaft OS connected with the third shaft TM2.

In the forward tenth speed D10, the first and second clutch C1 and C2 and the first brake B1 are simultaneously operated.

As a result, the first shaft TM1 and the second shaft TM2 are connected with the input shaft IS by the operation of the first and second clutch C1 and C2. In this state, a torque is input to the first shaft TM1 and the second shaft TM2.

In addition, the sixth shaft TM6 acts as a fixed element by the operation of the first brake B1, thereby realizing the forward tenth speed and outputting a shifted torque to the output shaft OS connected with the third shaft TM3.

In the reverse speed REV, the first, third clutch C1 and C3 and the first brake B1 are simultaneously operated.

As a result, the first shaft TM1 is connected with the input shaft IS by the operation of the first clutch C1, and the first shaft TM1 is connected with the fifth shaft TM5 by the operation of the third clutch C3. In this state, the input torque is input to the first shaft TM1.

In addition, the sixth shaft TM6 acts as a fixed element by the operation of the first brake B1, thereby realizing the reverse speed and outputting a shifted torque to the output shaft OS connected with the third shaft TM3.

As described above, a planetary gear train according to an exemplary embodiment of the present invention may realize ten forward speeds and one reverse speed by operating the four planetary gear sets PG1, PG2, PG3, and PG4 by controlling the four clutches C1, C2, C3, and C4 and the two brakes B1 and B2.

In addition, a planetary gear train according to an exemplary embodiment of the present invention may substantially improve driving stability by realizing shift-stages appropriate for rotation speed of an engine due to multi-stages of an automatic transmission.

In addition, a planetary gear train according to an exemplary embodiment of the present invention may maximize engine driving efficiency by multi-stages of an automatic transmission, and may improve power delivery performance and fuel consumption.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, comprising:
   an input shaft for receiving an engine torque;
   an output shaft for outputting a shifted torque;
   a first planetary gear set having a first rotational element, a second rotational element, and a third rotational element;
   a second planetary gear set having a fourth rotational element, a fifth rotational element, and a sixth rotational element;
   a third planetary gear set having a seventh rotational element, an eighth rotational element, and a ninth rotational element;
   a fourth planetary gear set having a tenth rotational element, an eleventh rotational element, and a twelfth rotational element;
   a first shaft fixedly connected to the third rotational element and selectively connected to the input shaft;

a second shaft fixedly connected to the ninth rotational element and selectively connected to the input shaft;

a third shaft fixedly connected to the eleventh rotational element and fixedly connected to the output shaft;

a fourth shaft fixedly connected to the first rotational element, the fourth rotational element, and the seventh rotational element;

a fifth shaft fixedly connected to the second rotational element and the tenth rotational element; and a plurality of shafts each selectively connecting a corresponding element to a transmission housing, wherein the corresponding element is a rotational element, that is not fixedly interconnected, of one or more of the second planetary gear set, the third planetary gear sets, or the fourth planetary gear set;

wherein the plurality of shafts comprises:

a sixth shaft fixedly connected to the fifth rotational element and the eighth rotational element, wherein the sixth shaft is selectively connected to the transmission housing; and a seventh shaft fixedly connected to the sixth rotational element and the twelfth rotational element, wherein the seventh shaft is selectively connected to the transmission housing;

wherein the input shaft and the first shaft are selectively interconnected to each other, the input shaft and the second shaft are selectively interconnected to each other, the first shaft and the fifth shaft are selectively interconnected to each other, and the first shaft and the sixth shaft are selectively interconnected to each other.

2. The planetary gear train of claim 1, further comprising:

four clutches, each clutch of the four clutches selectively connecting a corresponding pair of shafts selected from the input shaft, the output shaft, the first shaft, the second shaft, the third shaft, the fourth shaft, the fifth shaft, the sixth shaft, and the seventh shaft; and two brakes, each brake of the two brakes selectively connecting one of the sixth shaft and or the seventh shaft to the transmission housing, respectively.

3. The planetary gear train of claim 2, wherein the four clutches comprise:

a first clutch arranged between the input shaft and the first shaft;

a second clutch arranged between the input shaft and the second shaft;

a third clutch arranged between the first shaft and the fifth shaft; and a fourth clutch arranged between the first shaft and the sixth shaft; and wherein the two brakes comprise:

a first brake arranged between the sixth shaft and the transmission housing; and a second brake arranged between the seventh shaft and the transmission housing.

4. The planetary gear train of claim 1, wherein the first planetary gear set is a single pinion planetary gear set having a first sun gear, a first planet carrier, and a first ring gear as the first rotational element, the second rotational element, and the third rotational element;

wherein the second planetary gear set is a single pinion planetary gear set having a second sun gear, a second planet carrier, and a second ring gear as the fourth rotational element, the fifth rotational element, and the sixth rotational element;

wherein the third planetary gear set is a single pinion planetary gear set having a third sun gear, a third planet carrier, and a third ring gear as the seventh rotational element, the eighth rotational element, and the ninth rotational element; and wherein the fourth planetary gear set is a single pinion planetary gear set having a fourth sun gear, a fourth planet carrier, and a fourth ring gear as the tenth, eleventh, and twelfth rotational elements.

5. The planetary gear train of claim 1, wherein the first planetary gear set, the second planetary gear set, the third planetary gear set, and the fourth planetary gear set are arranged in an order, from an engine side, of the third planetary gear set, the second planetary gear set, the fourth planetary gear set, and the first planetary gear set.

6. A planetary gear train of an automatic transmission for a vehicle, comprising:

an input shaft for receiving an engine torque;

an output shaft for outputting a shifted torque;

a first planetary gear set having a first rotational element, a second rotational element, and a third rotational element;

a second planetary gear set having a fourth rotational element, a fifth rotational element, and a sixth rotational element;

a third planetary gear set having a seventh rotational element, an eighth rotational element, and a ninth rotational element; and a fourth planetary gear set having a tenth rotational element, an eleventh rotational element, and a twelfth rotational element;

wherein the first rotational element is fixedly connected to the fourth rotational element and the seventh rotational element;

wherein the second rotational element is fixedly connected to the tenth rotational element;

wherein the third rotational element is selectively connected to the second rotational element, the eighth rotational element, and the input shaft, respectively;

wherein the fifth rotational element is fixedly connected to the eighth rotational element, and selectively connected to a transmission housing;

wherein the sixth rotational element is fixedly connected to the twelfth rotational element, and selectively connected to the transmission housing;

wherein the ninth rotational element is selectively connected to the input shaft; and wherein the eleventh rotational element is fixedly connected to the output shaft.

7. The planetary gear train of claim 6, further comprising:

four clutches, each clutch of the four clutches selectively connecting a corresponding pair of elements selected from the input shaft, the output shaft, and one or more rotational elements selected from the first rotational element through the twelfth rotational element; and two brakes, each brake of the two brakes selectively connecting one of the fifth rotational element and the sixth rotational element to the transmission housing, respectively.

8. The planetary gear train of claim 7, wherein the four clutches comprise:

a first clutch arranged between the input shaft and the third rotational element;

a second clutch arranged between the input shaft and the ninth rotational element;

a third clutch arranged between the second rotational element and the third rotational element; and a fourth clutch arranged between the third rotational element and the eighth rotational element; and wherein the two brakes comprise:
- a first brake arranged between the fifth rotational element and the transmission housing; and
- a second brake arranged between the sixth rotational element and the transmission housing.

9. The planetary gear train of claim 6, wherein the first planetary gear set is a single pinion planetary gear set having a first sun gear, a first planet carrier, and a first ring gear as the first rotational element, the second rotational element, and the third rotational element;
wherein the second planetary gear set is a single pinion planetary gear set having a second sun gear, a second planet carrier, and a second ring gear as the fourth rotational element, the fifth rotational element, and the sixth rotational element;
wherein the third planetary gear set is a single pinion planetary gear set having a third sun gear, a third planet carrier, and a third ring gear as the seventh rotational element, the eighth rotational element, and the ninth rotational element; and
wherein the fourth planetary gear set is a single pinion planetary gear set having a fourth sun gear, a fourth planet carrier, and a fourth ring gear as the tenth rotational element, the eleventh rotational element, and the twelfth rotational element.

10. The planetary gear train of claim 6, wherein the first planetary gear set, the second planetary gear set, the third planetary gear set, and the fourth planetary gear set are arranged in an order, from an engine side, of the third planetary gear set, the second planetary gear set, the fourth planetary gear set, and the first planetary gear set.

11. A vehicle, comprising:
an engine having a crankshaft;
a driveshaft;
an automatic transmission having an a planetary gear train disposed in a transmission housing, the planetary gear train comprising:
  an input shaft connected to the crankshaft;
  an output shaft connected to the driveshaft;
  a first planetary gear set having a first rotational element, a second rotational element, and a third rotational element;
  a second planetary gear set having a fourth rotational element, a fifth rotational element, and a sixth rotational element;
  a third planetary gear set having a seventh rotational element, an eighth rotational element, and a ninth rotational element; and
  a fourth planetary gear set having a tenth rotational element, an eleventh rotational element, and a twelfth rotational element;
  wherein the first rotational element is fixedly connected to the fourth rotational element and the seventh rotational element;
  wherein the second rotational element is fixedly connected to the tenth rotational element;
  wherein the third rotational element is selectively connected to the second rotational element, the eighth rotational element, and the input shaft, respectively;
  wherein the fifth rotational element is fixedly connected to the eighth rotational element, and selectively connected to the transmission housing;
  wherein the sixth rotational element is fixedly connected to the twelfth rotational element, and selectively connected to the transmission housing;
  wherein the ninth rotational element is selectively connected to the input shaft; and
  wherein the eleventh rotational element is fixedly connected to the output shaft.

12. The vehicle of claim 11, the planetary gear train further comprising:
four clutches, each clutch of the four clutches selectively connecting a corresponding pair of elements selected from the input shaft, the output shaft, and one or more rotational elements selected from the first rotational element through the twelfth rotational element; and
two brakes, each brake of the two brakes selectively connecting one of the fifth rotational element and the sixth rotational element to the transmission housing, respectively.

13. The vehicle of claim 12, wherein the four clutches comprise:
a first clutch arranged between the input shaft and the third rotational element;
a second clutch arranged between the input shaft and the ninth rotational element;
a third clutch arranged between the second rotational element and the third rotational element; and
a fourth clutch arranged between the third rotational element and the eighth rotational element; and
wherein the two brakes comprise:
  a first brake arranged between the fifth rotational element and the transmission housing; and
  a second brake arranged between the sixth rotational element and the transmission housing.

14. The vehicle of claim 11, wherein the first planetary gear set is a single pinion planetary gear set having a first sun gear, a first planet carrier, and a first ring gear as the first rotational element, the second rotational element, and the third rotational element;
wherein the second planetary gear set is a single pinion planetary gear set having a second sun gear, a second planet carrier, and a second ring gear as the fourth rotational element, the fifth rotational element, and the sixth rotational element;
wherein the third planetary gear set is a single pinion planetary gear set having a third sun gear, a third planet carrier, and a third ring gear as the seventh rotational element, the eighth rotational element, and the ninth rotational element; and
wherein the fourth planetary gear set is a single pinion planetary gear set having a fourth sun gear, a fourth planet carrier, and a fourth ring gear as the tenth rotational element, the eleventh rotational element, and the twelfth rotational element.

15. The vehicle of claim 11, wherein the first planetary gear set, the second planetary gear set, the third planetary gear set, and the fourth planetary gear set are arranged in an order, from an engine side, of the third planetary gear set, the second planetary gear set, the fourth planetary gear set, and the first planetary gear set.

* * * * *

UNITED STATES PATENT AND TRADEMARK OFFICE
CERTIFICATE OF CORRECTION

PATENT NO.        : 10,393,234 B2
APPLICATION NO.   : 15/817570
DATED             : August 27, 2019
INVENTOR(S)       : Hyun Sik Kwon et al.

Page 1 of 1

It is certified that error appears in the above-identified patent and that said Letters Patent is hereby corrected as shown below:

On the Title Page

Item (54), and in the Specification Column 1 Lines 1-2 delete "PLANETARY GEAR TRAIN OF TRANSMISSION FOR VEHICLE" and insert --PLANETARY GEAR TRAIN OF AUTOMATIC TRANSMISSION FOR VEHICLE--.

Signed and Sealed this
Twenty-ninth Day of October, 2019

Andrei Iancu
*Director of the United States Patent and Trademark Office*